Figure 1:
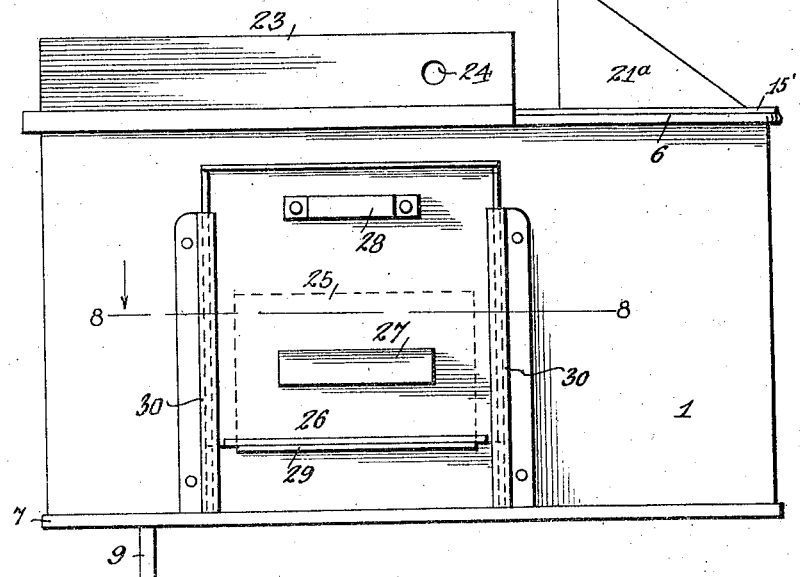

Jan. 6, 1925.

J. A. H. FINK

WATERING TROUGH

Filed Nov. 25, 1922

1,522,004

3 Sheets-Sheet 1

INVENTOR.
Joseph A. H. Fink,
BY
Geo. P. Kimmel, ATTORNEY.

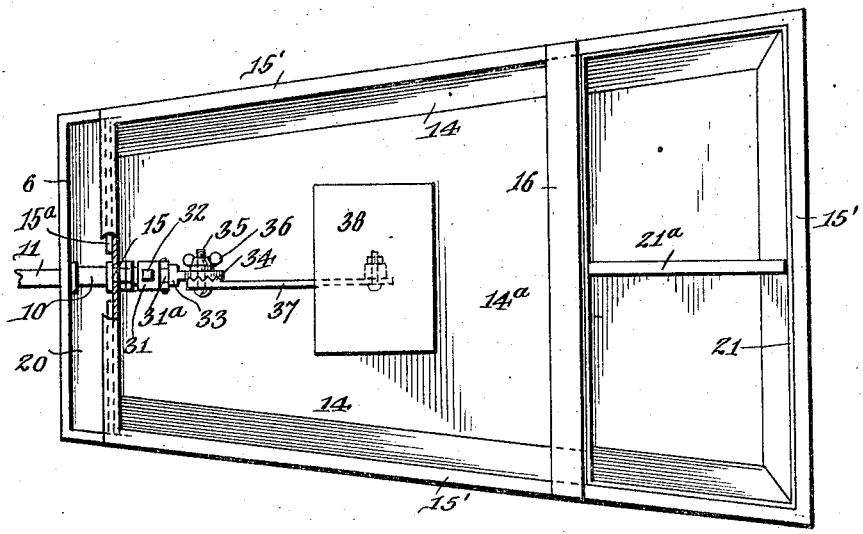
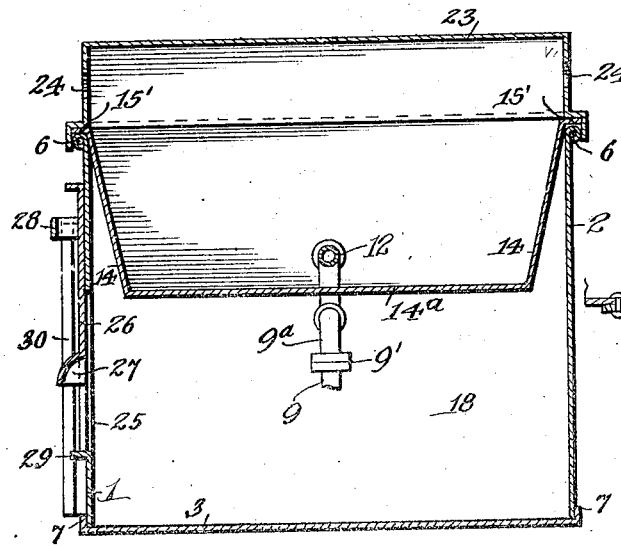
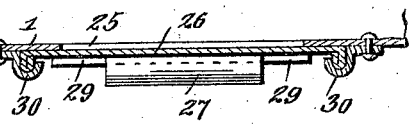

Jan. 6, 1925.  1,522,004
J. A. H. FINK
WATERING TROUGH
Filed Nov. 25, 1922   3 Sheets-Sheet 3

Joseph A. H. Fink
INVENTOR.

BY Geo. P. Kimmel
ATTORNEY.

Patented Jan. 6, 1925.

1,522,004

UNITED STATES PATENT OFFICE.

JOSEPH AUGUST H. FINK, OF HAMPTON, IOWA.

WATERING TROUGH.

Application filed November 25, 1922. Serial No. 603,232.

*To all whom it may concern:*

Be it known that I, JOSEPH AUGUST H. FINK, a citizen of the United States, residing at Hampton, in the county of Franklin and State of Iowa, have invented certain new and useful Improvements in Watering Troughs, of which the following is a specification.

This invention relates to watering troughs, designed primarily for the watering of hogs, but it is to be understood that a trough in accordance with this invention, can be employed in connection with any purposes wherein it is found applicable, and the invention has for its object to provide a watering trough, in the manner as hereinafter set forth, with means to provide for the automatic supply of water thereto as the level of the body of water is lowered by the drinking of the water by the animals, to provide means to prevent the freezing of the water in cold weather, and to provide the trough with means for collecting and to permit of the removal of the dirt deposited in the trough by the animals when drinking.

Further objects of the invention are to provide a water trough for the purpose set forth which is simple in its construction and arrangement, strong, durable, compact, readily assembled, efficient and convenient in its use, and comparatively inexpensive.

With the foregoing and other objects in view, the invention consists in the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 2:
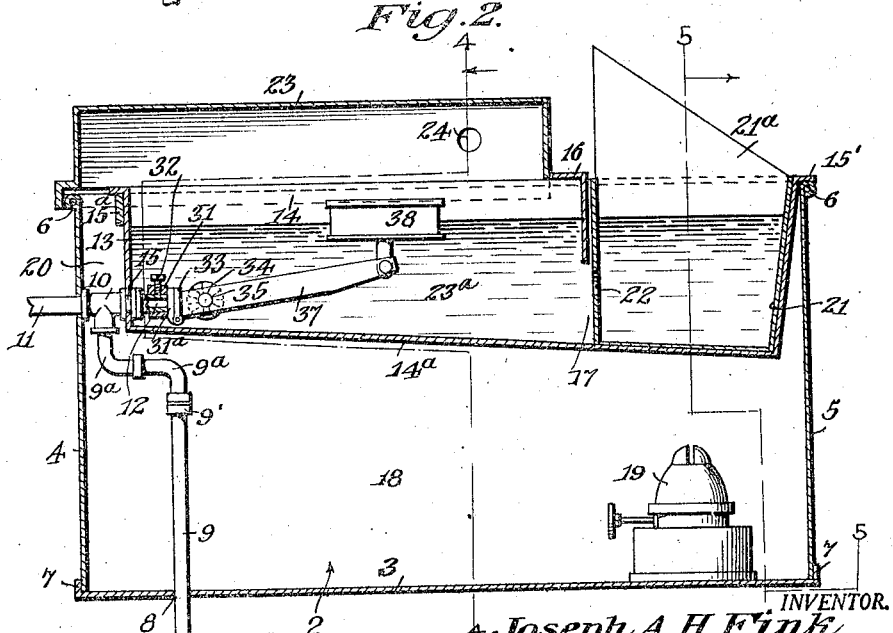
Figure 5:
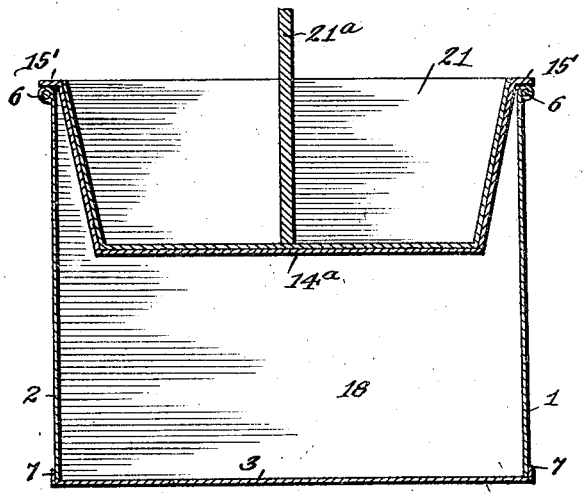
Figure 6:
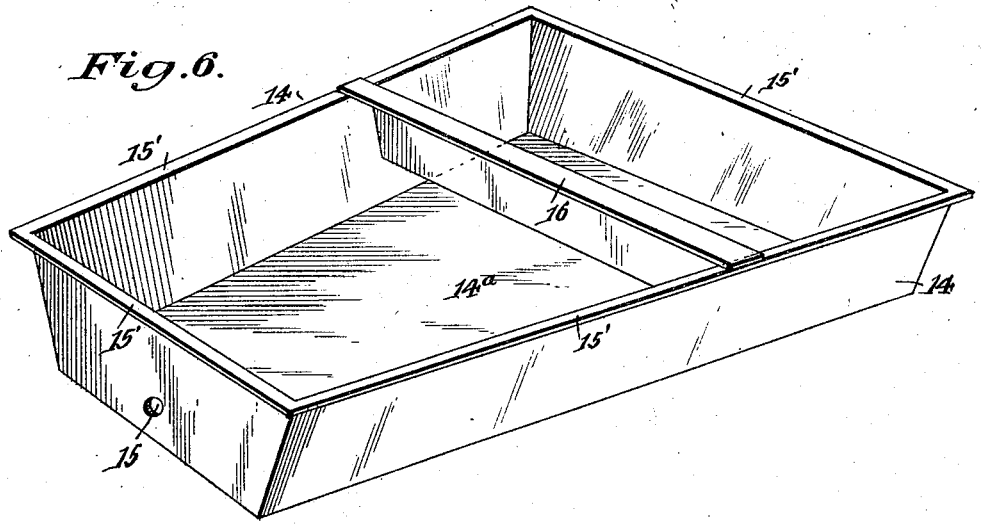
Figure 7:
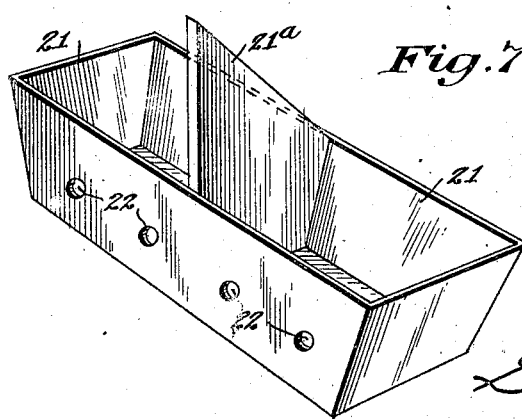

Figure 1 is a side elevation of a watering trough in accordance with this invention, Fig. 2 is a longitudinal sectional view thereof, Fig. 3 is a plan view with the cover removed, Fig. 4 is a section on line 4—4 of Fig. 2, Fig. 5 is a section on line 5—5 of Fig. 2, Fig. 6 is a perspective view of the water container, Fig. 7 is a perspective view of the dirt collector, Fig. 8 is a section on line 8—8 of Fig. 1.

Referring to the drawings in detail, a watering trough in accordance with this invention comprises a body portion in the form of a tapered receptacle, which is open at its top, and includes a front wall 1, a rear wall 2, a bottom 3, and a pair of end walls 4, 5. The upper end of the front, rear and end walls is formed with an outwardly extending bead 6. The bottom 3 is flanged as at 7, and which overlaps the front, rear and end walls. The bottom 4 is also provided near one end with an opening 8, for the passage of a vertically disposed water supply pipe 9. The pipe 9 leads from any suitable source of supply, and is connected by a bushing 9' and elbows 9ª to a T-coupling 10, to which a branch pipe 11 is attached for connection to a tank when desired. To the T-coupling 10 is secured a feed pipe 12, which projects through the rear wall 13 of a water container 14. The feed pipe 12 is fixedly secured in position by a clamping nut 15, which bears against the inner face of the rear wall 13 of the container 14.

The water container 14, is in the form of a tapered pan, and has the side and end walls thereof formed with a lateral flange 15', which at the sides and forward end wall of the water container 14, is seated on the bead 6 of the end wall 5 and front and rear walls of the body portion. Arranged within the body portion, at the top thereof, and in proximity to the end wall 4, is a supporting member 15, upon which is seated that portion of the flange 15' which projects from the rear wall 13 of the water container 14.

The water container 14, at a point between its transverse center and the forward end wall thereof, is provided with a partition 16, which terminates at a point above the bottom 14ª of the water container 14, and divides the latter into two compartments, which communicates through the medium of a passage 17 formed between partition and the bottom 14ª; the latter inclining downwardly from the rear to the front wall of the container 14.

The water container 14, in connection with the body portion of the device, provides a chamber 18, in which is arranged a heating element 19, as shown in the form of an oil lamp. The heating element 19 terminates at a point below the bottom 14ª, of the water container, and as the latter is of less length than the length of the body portion, an outlet passage 20 is provided for the chamber 18.

Seated in the water container 14, forwardly of the partition 16 is a flanged collecting pan 21, having that wall thereof, which opposes the partition 16, provided with a series of openings 22, positioned at the passage 17, so that the water 23, will be supplied to the collector 21. The collector 21 is removably mounted in the water container 14, and is adapted to collect the dirt deposited by the animals when drinking and as the collector is removable, it can be readily taken out of the water container 14, and the dirt deposited therein, dumped therefrom. Arranged within and extending upwardly from the pan 21, is a partition 21ª to prevent animals from laying in the pan or trough 21.

By the employment of the collector 21, the water container 14 is prevented from being lodged with the dirt deposited by the animals when drinking.

Mounted on the body portion of the trough, rearwardly of the collector 21, is a compartment cover 23, having its side walls formed with vent openings 24, for the chamber 18. The rear end and side walls of the said cover are flanged so as to overlap the rear end and side walls of said receptacle. The cover 23 abuts against the partition 16.

The front wall 1 of the body portion, is formed with an opening 25, so that access can be had to the chamber 18, and said opening is normally closed by a sliding door 26, formed with an air inlet opening 27, and is also provided with a handle 28, near its upper end. The front wall 1 has a stop 29 for limiting the downward movements of the door 26, and said front wall is furthermore provided with a pair of vertically disposed guides 30.

Secured on the feed pipe 12, is a collar 31, which is secured in position by a clamping screw 32 and provided with a seat 31ª. Hinged to the seat 31ª, is a cut off or valve 33, which normally closes the feed pipe 12. Projecting from the cut off 33 is a serrated arm 34, to which is adjustably connected by a threaded bolt 35 and a wing nut 36, an inclined lever arm 37, which carries a float 38. The function of the float 38, is to shift the lever arm 37, so as to cause the cut off 33 to normally close the feed pipe 12. When the float 38 lowers, the cut off 33 is swung downwardly thereby providing for a supply of water to the pipe 12, but when the float moves upwardly, the cut off is shifted to closing position with respect to the pipe 12.

The float 38 provides for the automatic supply of water to the container 14, if the level of the water lowers, due to the drinking of the water by the animals, and by this arrangement, the container 14 is always supplied with water up to a certain height. Furthermore, by the employment of the float in connection with the cut-off, it prevents any possibility of the water container 14 overflowing at any time.

From the foregoing description taken in connection with the accompanying drawings, a watering trough is set up which can be conveniently cleaned when occasion requires, due to the fact that the collector 21 can be removed from the container 14, and the deposited dirt dumped therefrom. By the arrangement of the heating element, in the manner as shown, means is set up to prevent the water in the container from freezing and further access can be had to the heating element to lengthen or decrease the length of the heating flame of the lamp when occasion so requires, and although the drawing illustrates the preferred embodiment of the invention, yet it is to be understood that changes in the details of construction can be had without departing from the spirit of the invention as claimed.

What I claim is:—

1. A stock watering device comprising a receptacle tapering lengthwise and open at its top, a flanged top water container arranged within and supported by its flanges from the top edge of said receptacle and spaced from the rear wall and bottom of said receptacle thereby providing a chamber and a passage leading therefrom, a compartment cover seated on said receptacle and container and partially closing said container and extending over said passage, said passage establishing communication between the compartment cover and said chamber, said compartment cover having its sides provided with vent openings, said receptacle having one side provided with an entrance opening, and a shiftable closure for said entrance opening, said closure having a normally opened inlet, and said cover being flanged to overlap the flange of the container and the rear end wall of the receptacle.

2. A stock watering device comprising a receptacle tapering lengthwise and having an open top, a tapered flanged water container supported within the upper portion and having its flanges seated on the top edges of said receptacle and provided near its front end with a vertically disposed transverse partition depending from its top and spaced from its bottom, a tapered collector positioned transversely within said container between said partition and the forward end wall of the container, said collector having the lower portion of its rear wall provided with openings communicating with said container below said partition, a cover for that portion of the container extending rearwardly from said partition, and a vertically disposed partition mounted in said collector and extending above said cover, said partition having its top edge inclining downwardly in a direction towards the front edge of the partition.

3. A stock watering device comprising a receptacle tapering lengthwise and having an open top and a supporting member extending transversely of said top and positioned in proximity to the rear end of the receptacle, a water container arranged within the upper portion of said receptacle and provided at its top with flanges seating on said member and the sides and front walls of the receptacle, said container at a point between its transverse center and the front end provided with a transversely extending partition depending from the top and spaced from the bottom thereof, and a cover for that portion of the container rearwardly of said partition, said cover seating on the side flanges of the container and the rear end of the receptacle.

4. A stock watering device comprising a receptacle tapering lengthwise and having an open top and a supporting member extending transversely of said top and positioned in proximity to the rear end of the receptacle, a water container arranged within the upper portion of said receptacle and provided at its top with flanges seating on said member and the sides and front walls of the receptacle, said container at a point between its transverse center and the front end provided with a transversely extending partition depending from the top and spaced from the bottom thereof, a cover for that portion of the container rearwardly of said partition, said cover seating on the side flanges of the container and the rear end of the receptacle, said container in connection with said receptacle forming a heating chamber, and said container having its rear end spaced from the rear end of said receptacle thereby providing a passage for establishing communication between the cover and said chamber.

5. A stock watering device comprising a receptacle tapering lengthwise and having an open top and a supporting member extending transversely of said top and positioned in proximity to the rear end of the receptacle, a water container arranged within the upper portion of said receptacle and provided at its top with flanges seating on said member and the sides and front walls of the receptacle, said container at a point between its transverse center and the front end provided with a transversely extending partition depending from the top and spaced from the bottom thereof, a cover for that portion of the container rearwardly of said partition, said cover seating on the side flanges of the container and the rear end of the receptacle, said container in connection with said receptacle forming a heating chamber, said container having its rear end spaced from the rear end of said receptacle thereby providing a passage for establishing communication between the cover and said chamber, and said receptacle and cover provided with means to provide for the circulation of air through said chamber.

6. A stock watering device comprising a tapering water container at a point between its transverse center and its forward end provided with a transversely extending partition depending from the top and terminating from the bottom thereof to provide a passage for establishing communication between the compartments formed by said partition, a tapered collector extending transversely of said container and positioned in one of said compartments forwardly of said partition, said collector having the lower portion of its rear wall provided with openings arranged below said partition whereby communication is established between the collector and the container, a cover for closing that portion of the container rearwardly of said partition, and a vertically disposed partition mounted in said collector and extending above said cover and having its top edge inclining downwardly in a direction towards the front edge thereof.

7. In a stock watering device a water container comprising a bottom inclining downwardly towards its forward end, said bottom gradually increasing in width from its rear towards its forward end, side, front and rear walls extending upwardly from said bottom and each provided at its top with an outwardly extending flange for supporting the container, the said side and front walls inclining outwardly with respect to said bottom, and a vertically disposed transverse partition arranged between the side walls of said body portion, extending from the top and terminating at a point removed from the bottom of said side walls and having its upper end formed with a rearwardly directed flange seated on the flanges of the side walls.

In testimony whereof, I affix my signature hereto.

JOSEPH AUGUST H. FINK.